United States Patent
Broeders et al.

(10) Patent No.: US 10,501,223 B2
(45) Date of Patent: Dec. 10, 2019

(54) SEALING ORIENTED FILMS

(71) Applicant: BOREALIS AG, Vienna (AT)

(72) Inventors: Bert Broeders, Beringen (BE); Manfred Tryner, Vienna (AT)

(73) Assignee: BOREALIS AG, Vienna (AT)

( * ) Notice: Subject to any disclaimer, the term of this patent is extended or adjusted under 35 U.S.C. 154(b) by 976 days.

(21) Appl. No.: 14/440,959

(22) PCT Filed: Nov. 7, 2013

(86) PCT No.: PCT/EP2013/073264
§ 371 (c)(1),
(2) Date: May 6, 2015

(87) PCT Pub. No.: WO2014/072403
PCT Pub. Date: May 15, 2014

(65) Prior Publication Data
US 2015/0298843 A1    Oct. 22, 2015

(30) Foreign Application Priority Data
Nov. 7, 2012 (EP) ..................................... 12191702

(51) Int. Cl.
*B32B 37/00* (2006.01)
*B65B 51/22* (2006.01)
(Continued)

(52) U.S. Cl.
CPC .......... *B65B 51/225* (2013.01); *B29C 65/08* (2013.01); *B29C 66/43121* (2013.01);
(Continued)

(58) Field of Classification Search
CPC ......... B65B 51/225; B65B 5/04; B29C 65/08; B29C 66/43121; B29C 66/71;
(Continued)

(56) References Cited

U.S. PATENT DOCUMENTS 4,373,979 A    2/1983   Planeta ........................ 156/73.1
4,517,790 A *  5/1985   Kreager .............. B29C 65/7443
                                                    156/353

(Continued)

FOREIGN PATENT DOCUMENTS

CN    201483769 U    5/2010
CN    101959927 A    1/2011
(Continued)

OTHER PUBLICATIONS

International Search Report and Written Opinion of the International Searching Authority dated Feb. 5, 2014, for application PCT/EP2013/073264, filed on Nov. 7, 2013, and published as WO 2014/072403 on May 15, 2014 (11 pages).

(Continued)

*Primary Examiner* — James D Sells
(74) *Attorney, Agent, or Firm* — Ballard Spahr LLP (57) ABSTRACT

A process for sealing a machine direction oriented polypropylene or polyethylene film to a substrate comprising bringing said film and said substrate into contact and subjecting at least a part of the contact area to ultrasound so as to form a seal between said film and said substrate.

12 Claims, 2 Drawing Sheets

(51) Int. Cl.
  *B29C 65/08* (2006.01)
  *B29C 65/00* (2006.01)
  *B32B 27/08* (2006.01)
  *B32B 27/32* (2006.01)
  *B32B 37/06* (2006.01)
  *B65B 5/04* (2006.01)
  *B65D 75/30* (2006.01)
  *B32B 37/04* (2006.01)
  *B29L 31/00* (2006.01)
  *B29C 55/06* (2006.01)
  *B65B 9/073* (2012.01)
  *B32B 37/18* (2006.01)

(52) U.S. Cl.
  CPC .......... *B29C 66/71* (2013.01); *B29C 66/7392* (2013.01); *B29C 66/73711* (2013.01); *B29C 66/73712* (2013.01); *B32B 27/08* (2013.01); *B32B 27/32* (2013.01); *B32B 27/327* (2013.01); *B32B 37/04* (2013.01); *B32B 37/06* (2013.01); *B65B 5/04* (2013.01); *B65D 75/30* (2013.01); *B29C 55/06* (2013.01); *B29C 66/1122* (2013.01); *B29C 66/723* (2013.01); *B29C 66/7234* (2013.01); *B29C 66/7313* (2013.01); *B29C 66/7352* (2013.01); *B29C 66/73713* (2013.01); *B29C 66/949* (2013.01); *B29L 2031/7126* (2013.01); *B29L 2031/7129* (2013.01); *B32B 37/182* (2013.01); *B32B 2250/02* (2013.01); *B32B 2250/242* (2013.01); *B32B 2307/306* (2013.01); *B32B 2307/518* (2013.01); *B32B 2307/54* (2013.01); *B32B 2307/558* (2013.01); *B32B 2310/028* (2013.01); *B32B 2439/00* (2013.01); *B32B 2439/70* (2013.01); *B32B 2439/80* (2013.01); *B65B 9/073* (2013.01)

(58) Field of Classification Search
  CPC ......... B29C 66/73711; B29C 66/73712; B29C 66/7392; B32B 27/08; B32B 27/32; B32B 27/327; B32B 37/04; B32B 37/06; B65D 75/30
  USPC ....................................................... 156/73.1
  See application file for complete search history.

(56) References Cited

U.S. PATENT DOCUMENTS

| | | | |
|---|---|---|---|
| 4,965,985 | A | 10/1990 | Masubuchi et al. |
| 7,351,297 | B2* | 4/2008 | Middlesworth ..... A61F 13/4902 156/161 |
| 7,645,353 | B2* | 1/2010 | Thomaschefsky ........ B32B 5/26 156/290 |
| 2002/0104292 | A1 | 8/2002 | Tsuruta |
| 2007/0131335 | A1* | 6/2007 | Zhou ................. A61F 13/15593 156/73.1 |
| 2007/0215610 | A1 | 9/2007 | Su ................................. 219/730 |
| 2009/0017290 | A1* | 1/2009 | Jung ....................... B32B 27/08 428/336 |
| 2011/0117307 | A1* | 5/2011 | Fraser ................ B32B 37/0076 428/66.6 |
| 2011/0192117 | A1 | 8/2011 | Lubezny et al. |
| 2012/0097339 | A1* | 4/2012 | Hull ........................ B29C 65/08 156/580.1 |

FOREIGN PATENT DOCUMENTS

| | | |
|---|---|---|
| DE | 3905605 A1 | 1/1990 |
| DE | 10 2011 015491 | 6/2012 |
| EP | 0332341 | 9/1989 |
| EP | 517868 | 12/1992 |
| EP | 1837162 | 9/2007 |
| EP | 2505337 | 10/2012 |
| JP | 2009 012779 | 1/2009 |
| JP | 2011-63002 A | 3/2011 |
| WO | WO-2009/111058 A1 | 9/2009 |
| WO | WO 2011/050380 | 5/2011 |
| WO | WO 2011/060460 | 5/2011 |
| WO | WO 2012/106742 | 8/2012 |

OTHER PUBLICATIONS

International Preliminary Report on Patentability dated May 12, 2015 by the International Searching Authority for Patent Application No. PCT/EP2013/073264, which was filed on Nov. 7, 2013 and published as WO 2014/072403 on May 15, 2014 (Inventor—Broeders et al.; Applicant—Borealis AG) (6 pages).

* cited by examiner

Graph 1 – MDO film based on FB2230: heat versus ultrasonic sealing

SEALING ORIENTED FILMS

CROSS-REFERENCE TO RELATED APPLICATIONS

This application is a U.S. National Phase Application of International Application No. PCT/EP2013/073264, filed on Nov. 7, 2013, which claims priority to European Patent Application No. 12191702.5, filed Nov. 7, 2012, each of which are hereby incorporated by reference in their entirety.

A new abstract page on a separate sheet in accordance with 37 C.F.R. § 1.72 is attached hereto. Please replace the Abstract with the following replacement Abstract:

A process for sealing a machine direction oriented polypropylene or polyethylene film to a substrate comprising bringing said film and said substrate into contact and subjecting at least a part of the contact area to ultrasound so as to form a seal between said film and said substrate.

This invention relates to the sealing of a polyolefinic oriented film to a substrate such as a polyolefinic substrate, in particular to the sealing of machine direction oriented polyolefinic film to a polyolefinic substrate and especially to the use of ultrasonic welding in forming said seal with the substrate. In a further embodiment, the substrate is also a machine direction oriented polyolefinic film.

BACKGROUND

Polyolefin films have been used in packaging for many years. Many of these films are oriented films which have been stretched, typically in the machine direction, to provide films ideal for the packaging industry. Oriented films offer a wealth of advantageous properties, due to a change in the morphology of the film's molecular structure such as excellent mechanical properties, impermeability to moisture, high resistance to oils and fats and scratch resistance. These films are often low haze and high gloss and can be printed upon easily.

Machine Direction Oriented (MDO) films are, however, very difficult to seal by means of heat sealing. Exposing the highly oriented film to heat results in severe shrinkage of the film and rather low seal strength. The industry has generally solved this problem by designing complex multilayer film structures and using particular materials in the sealing layers of multilayer films.

It is known, for example, that homopolymers are characterised by low seal strength and their use in sealing layers is therefore avoided. Homopolymers often have higher melting points than copolymers making them harder to heat seal for example. Therefore multilayer film structures typically comprising a terpolymer, propylene random or propylene block copolymer are often used in oriented films. Biaxially oriented films are conventional made using polypropylene copolymers, for example.

Sealing is also a serious problem in more complex film operations such as in form fill and seal technology. In a typical form, fill and seal film sealing operation, the manufacturer has to seal different zones of the film. These zones may comprise 2, 3 or 4 film layers, especially where there are gussets present. Heat sealing the zones where 2 to 4 film thicknesses meet is difficult because the heat applied is often so great that the film can be damaged. If not enough heat is applied, a seal is not formed and the package integrity is at risk or the seal strength poor.

For oriented polyolefinic films therefore there are problems in heat sealing which need to be overcome. It would be useful to be able to seal homopolymer sealing layers or successfully seal multiple film layers without fear of damage.

The present inventors have realised that a potential solution to this problem is ultrasonic welding. Ultrasonic welding is an alternative sealing technology based on high frequency acoustic vibrations. Ultrasonic welding works by generating a very high voltage and converting that into high frequency vibrations by means of a converter (Piëzo elements).

A film surface to be sealed is exposed to the high frequency vibrations and that leads to interfilm and intermolecular friction between the film surface and the substrate to which the film is to be sealed. Heat is generated by friction in the sealing area and the sealing layer of the film and the substrate are sealed together.

Ultrasonic welding has traditionally been used in non polyolefinic environments. It has been used with laminates typically made of paper, aluminium or high-melting polymer films, such as polyethylene terephthalate. Its use in diaper technology is also known.

The use of ultrasonic welding of polyolefin films has been suggested but in few publications. In EP-A-1837162, a complex multilayer film is sealed using ultrasonic welding. In EP-A-0332341, HDPE baby bottle liners are described which are stretched in the transverse direction and ultrasonically welded at one end. US2007/0215610 also mentions ultrasonic welding as one sealing option in a complex coextruded film for microwave applications.

The present inventors have realised that ultrasonic welding offers an ideal solution to the problem of heat sealing in machine direction oriented (MDO) polyolefin film. No one before has considered the use of ultrasonic welding in machine direction oriented polyolefin film. The present inventors show that this form of welding is also applicable in MDO polyolefin film, providing excellent seal strength, especially in the transverse direction.

The use of ultrasonic welding with MDO polyolefin films allows the formation of incredibly high seal strengths, in most cases higher than can be achieved using conventional heat sealing technology. This is especially true for transverse direction sealing.

Moreover due to the nature of the technology (i.e. no contact to hot seal bars) there is hardly any film shrinkage. The use of ultrasonic welding may allow more exact welding processes to take place and may allow the formation of a smooth weld line. This makes the seal less likely to break and avoids unsightly crinkles or tears. Film sealing can also be effected in the presence of contaminants on the sealing surface.

A further major benefit of the use of ultrasonic welding relates to a saving in raw material costs. When forming a seal between surfaces using conventional heat sealing, the layers may overlap by as much as 10 mm. Much of this overlap is therefore wasted film. With ultrasonic welding this overlap can be reduced to 6 mm. In the context of 2000 packages per hr, that adds up to a significant reduction in wastage. The process of the invention is therefore ideal for the manufacture of mass produced packaging such as heavy duty shipping bags.

The use of ultrasonic welding is therefore a significant leap forward for the MDO polyolefin film producer.

SUMMARY OF INVENTION

Thus viewed from one aspect the invention provides a process for sealing a machine direction oriented polypropylene or polyethylene film to a substrate, preferably a polypropylene or polyethylene substrate comprising bringing said film and said substrate into contact and subjecting at least a part of the contact area to ultrasound so as to form a seal between said film and said substrate.

Viewed from another aspect the invention provides the use of ultrasound in the sealing of a machine direction oriented polypropylene or polyethylene film to a substrate, preferably a polypropylene or polyethylene substrate.

Viewed from another aspect the invention provide a process for the packaging of a product, in particular a heat sensitive product, comprising providing a container having an open end comprising a machine direction oriented polypropylene or polyethylene film;

filling said container with said product by dispensing said product through the open end of the container; and sealing said container by ultrasonically welding the open end.

Viewed from another aspect the invention provide a process for the packaging of a product, in particular a heat sensitive product, comprising forming a container having an open end from a machine direction oriented polypropylene or polyethylene film;

filling said container with said product by dispensing said product through the open end of the container; and sealing said container by ultrasonically welding the open end to itself.

Viewed from another aspect the invention provides a product obtainable by a process as hereinbefore defined.

DEFINITIONS

The term machine direction oriented film means a film that has been stretched by at least 3 times its length in the machine direction.

By polypropylene is meant a polymer containing at least 70 wt % of propylene residues, preferably at least 80 wt % of propylene residues. Any comonomer present in a polypropylene of the invention is another alpha olefin.

By polyethylene is meant a polymer containing at least 70 wt % of ethylene residues, preferably at least 80 wt % of ethylene residues. Any comonomer present in a polypropylene of the invention is another alpha olefin.

DETAILED DESCRIPTION OF INVENTION

This invention relates to ultrasonic welding of a polyethylene or polypropylene machine direction oriented film to a substrate, preferably one which is also a polyethylene or polypropylene film.

The substrate can be the same as or different from the machine direction oriented film but both film and substrate are preferably based on polyethylene or polypropylene polymers. This means therefore that the machine direction oriented film comprises a polyethylene or polypropylene component and that the substrate comprises a polyethylene or polypropylene component.

In the films of the invention the MDO polyethylene or polypropylene film can be monolayer of multilayer. If the film is a multilayer film then the polyethylene or polypropylene polymer must at least be in the layer which is sealed to the substrate. The other layers of the film can however also contain polyethylene or polypropylene compounds of course.

The films of use in this invention are not themselves new and MDO films are available on the open market. These polyolefinic films are generally suitable in this case.

The substrate to which the MDO film of the invention is welded if also one which preferably contains a polyethylene or polypropylene. Again, the substrate might be monolayer or multilayer and if it is multilayer then the polyethylene or polypropylene compounds are preferably present in the layer that is sealed to the MDO film.

In a preferred embodiment, the substrate is a machine direction oriented polyethylene or polypropylene film as defined herein for the oriented film. Still more preferably the substrate and oriented film are the same film, i.e. the film is being ultrasonically welded to itself.

The substrates of the invention can, in addition to a layer based on a polyethylene or polypropylene olefin polymer comprise barrier layers such as those based on polyamides, ethylene vinyl alcohol, aluminised layers, ethylene acrylate polymers and so on. The substrate may also be a laminate.

It is generally observed that polymers which have proven to have excellent ultrasonic weld performance are not those which also perform well in conventional heat sealing. Propylene homopolymers for example can be ultrasonically welded successfully but perform poorly when heat sealed.

As noted in detail below, polymers of particular interest in the MDO films of the invention are those in which the sealing layer of the film comprises linear low density polyethylene, especially metallocene LLDPE's.

Polypropylene

Oriented films of the invention may contain a polypropylene polymer. The polypropylene may be a homopolymer or copolymer. Homopolymers comprise essentially 100 wt % propylene residues. It has been surprisingly found that propylene homopolymers can be successfully ultrasonically welded and this forms an aspect of the invention.

Propylene copolymers comprise at least one alpha olefin comonomer preferably selected from ethylene or a C4-10 alpha olefin such as 1-butene, 1-hexene or 1-octene. It is possible for there to be one comonomer or more than one comonomer such as two comonomers (thus forming a terpolymer). Preferably there is only one comonomer present. More preferably, the comonomer is ethylene. It is especially preferred if ethylene is the only comonomer present in the polypropylene copolymer.

Any copolymer may be a random copolymer or block copolymer, preferably a block copolymer.

The polypropylene polymer may be unimodal or multimodal. A unimodal polymer possesses a single peak in the GPC curve and is formed in a single step. The term unimodal means unimodal with respect to molecular weight distribution.

The polypropylene polymer can be a unimodal random polypropylene copolymer or a multimodal random polypropylene copolymer such as a random heterophasic polypropylene copolymer.

A multimodal polypropylene polymer of the invention is produced in at least two stages, ideally two stages only, and therefore contains at least two fractions, preferably two fractions only.

The term "multimodal" means herein, unless otherwise stated, multimodality with respect to molecular weight distribution and includes therefore a bimodal polymer. Usually, a polymer composition, comprising at least two polyolefin fractions, which have been produced under different polymerization conditions resulting in different (weight average) molecular weights and molecular weight distributions for the fractions, is referred to as "multimodal". The prefix "multi" relates to the number of different polymer fractions present in the polymer. Thus, for example, multimodal polymer includes so called "bimodal" polymer consisting of two fractions. The form of the molecular weight distribution curve, i.e. the appearance of the graph of the polymer weight fraction as a function of its molecular weight, of a multimodal polymer will show two or more maxima or is typically distinctly broadened in comparison with the curves for the individual fractions. For example, if a polymer is produced in a sequential multistage process, utilizing reactors coupled in series and using different conditions in each reactor, the polymer fractions produced in the different reactors will each have their own molecular weight distribution and weight average molecular weight. When the molecular weight distribution curve of such a polymer is recorded, the individual curves from these fractions form typically together a broadened molecular weight distribution curve for the total resulting polymer product.

It is preferred if the polypropylene polymer of the invention is multimodal especially bimodal. The components making up the multimodal polypropylene are preferably copolymers or a homopolymer and a copolymer and it is preferred that the components are different, e.g. with respect to their comonomer contents.

The comonomer content in the polypropylene copolymer is preferably in the range of 1 to 15 wt %, such as 2 to 12 wt %, preferably 3 to 10 wt %, such as 3.5 to 9 wt %.

The $MFR_2$ of the polypropylene polymer is preferably 12.0 g/10 min or less, such as 10.0 g/10 min or less, such as 8.0 g/10 min or less, especially 5 g/10 min or less. Minimum values might be 0.01 g/10 min, such as 0.1 g/10 min. Polypropylenes of the invention can also be nucleated using known nucleating agents such as sorbitols or polymers of cyclic vinyl compounds such as vinyl cyclohexane.

It has been generally observed that the presence of a long molecular weight chain improves performance of the polypropylene under ultrasonic welding conditions.

The random copolymer is preferably a random heterophasic copolymer. In the random heterophasic copolymer, one component thereof is typically a rubber having a high comonomer content and a second component contains a lower comonomer content.

Suitable polypropylenes are commercially available from suppliers such as Borealis, Dow, Exxon and so on.

The polypropylene polymer can be prepared using a Ziegler Natta or metallocene catalysis as is known in the art. Polypropylenes can be visbroken as is known in the art.

Polyethylene

The films of the invention may also comprise polyethylene. The polyethylene may be a homopolymer made in a low pressure or high pressure process (LDPE) or it may be a copolymer.

The polyethylene may have a density of from 890 to 980 $kg/m^3$, i.e. it may be HDPE, MDPE or an LLDPE. HDPE's have a density of at least 940 $kg/m^3$ and are least favoured in films.

Preferred polyethylenes for use in the manufacture of oriented films are LLDPE's. $MFR_2$ of the LLDPE is preferably in the range 0.01 to 20 g/10 min, e.g. 0.05 to 10 g/10 min, preferably 0.1 to 6.0 g/10 min. The $MFR_2$ is highly preferably in the range of 0.10 to 5 g/10 min.

The LLDPE of the oriented film may have a density in the range of 905 to 935 $kg/m^3$, preferably 910-930 $kg/m^3$ preferably such as 912 to 925 $kg/m^3$.

The weight average molecular weight Mw of the LLDPE is preferably no more than 100,000, preferably no more than 75000, such as 50,000 or less.

The Mw/Mn of the LLDPE is can vary. Preferred Mw/Mn values are 3 or more, such as 6 or more, even 10 or more. Ranges of 3.5 to 30 are envisaged.

The LLDPE contains at least one, preferably only one, comonomer. That comonomer is preferably a C3-10 alpha olefin comonomer. The use therefore of terpolymers is possible but is not favoured. Preferably the comonomer is 1-butene, 1-hexene or 1-octene. It is preferred if the comonomer employed is 1-butene or 1-hexene.

The amounts of comonomer present in the LLDPE can range from 0.5 to 10 wt %, such as 0.5 to 5 wt %, e.g. 1 to 4 wt %.

The LLDPE can be unimodal or multimodal, preferably multimodal. A unimodal LLDPE possesses a single peak in its GPC spectrum as it is made in a single stage process. These terms are discussed in detail above in connection with the polypropylene layer. It is most preferred if the LLDPE is a multimodal LLDPE formed from a homopolymer component and a copolymer component. These polymers are well known in the art and are available from Borealis and others, e.g. under the Borstar type trade name.

The LLDPE of the invention can be produced using Ziegler Natta catalysis or single site catalysis (mLLDPE), but is preferably produced using a Ziegler Natta catalyst. Such catalysts are well known in the art.

The polyethylene may also be a low density polyethylene (LDPE) made in a high pressure process as is well known in the art. The LDPE may have a density of 905 to 935 $kg/m^3$. It may have an $MFR_2$ of less than 2 g/10 min.

MDO films of the invention may of course contain a blend of different components in a film layer, either in a multilayer or mono layer film. For example the combination of an LDPE and LLDPE is a film layer is a preferred option. The combination of unimodal and bimodal LLDPE polymers is also preferred and so on.

Preparation of Polyethylene/Polypropylene

For the preparation of the polymers of the present invention polymerisation methods well known to the skilled person may be used. As catalyst any ordinary stereospecific Ziegler-Natta catalysts can be used. An essential component in those catalysts are solid catalyst components comprising a titanium compound having at least one titanium-halogen bond, an internal electron donor compound and a magnesium halide in active form as a carrier for both the titanium component and the donor compound. The catalysts may contain—as internal electron donor—compounds selected from ethers, ketones, lactones, compounds containing N, P and/or S atoms and esters of mono and dicarboxylic acids.

Any metallocene catalyst capable of catalysing the formation of a olefinic polymer can also be used. A suitable metallocene catalyst comprises a metallocene/activator reaction product impregnated in a porous support at maximum internal pore volume. The catalyst complex comprises a ligand which is typically bridged, and a transition metal of group IVa to VIa, and an organoaluminium compound. The catalytic metal compound is typically a metal halide.

Multimodal, e.g. bimodal, polymers are produced by blending each of the components in-situ during the polymerisation process thereof (so called in-situ process) in a manner known in the art.

The multimodal polymers useful in the present invention are preferably obtained by in-situ blending in a multistage, i.e. two or more stage, polymerization process including solution, slurry and gas phase process, in any order. Whilst it is possible to use different single site catalysts in each stage of the process, it is preferred if the catalyst employed is the same in both stages.

Ideally therefore, the multimodal polymers of the invention are produced in at least two-stage polymerization using the same catalyst. Thus, for example two slurry reactors or two gas phase reactors, or any combinations thereof, in any order can be employed. Preferably however, the polyethylene is made using a slurry polymerization in a loop reactor followed by a gas phase polymerization in a gas phase reactor.

A loop reactor-gas phase reactor system is well known as Borealis technology, i.e. as a BORSTAR™ reactor system. Such a multistage process is disclosed e.g. in EP517868.

The conditions used in such a process are well known. For slurry reactors, the reaction temperature will generally be in the range 60 to 110° C., e.g. 85-110° C., the reactor pressure will generally be in the range 5 to 80 bar, e.g. 50-65 bar, and the residence time will generally be in the range 0.3 to 5 hours, e.g. 0.5 to 2 hours. The diluent used will generally be an aliphatic hydrocarbon having a boiling point in the range −70 to +100° C., e.g. propane. In such reactors, polymerization may if desired be effected under supercritical conditions. Slurry polymerisation may also be carried out in bulk where the reaction medium is formed from the monomer being polymerised.

For gas phase reactors, the reaction temperature used will generally be in the range 60 to 115° C., e.g. 70 to 110° C., the reactor pressure will generally be in the range 10 to 25 bar, and the residence time will generally be 1 to 8 hours. The gas used will commonly be a non-reactive gas such as nitrogen or low boiling point hydrocarbons such as propane together with monomer.

A chain-transfer agent, preferably hydrogen, can be added as required to the reactors. A prepolymerisation step may precede the actual polymerisation process.

Where a unimodal polymer is used, this can be one formed in one stage of the process described above, e.g. the polymer formed in the loop reactor.

The polymers of the invention are not themselves new and processes for their manufacture are known. They are also commercially available.

It will be appreciated that both the polypropylene and polyethylene components of the films of the invention may contain standard polymer additives. These typically form less than 5 wt %, such as less than 2 wt % of the polymer material. Additives, such as antioxidants, phosphites, cling additives, pigments, colorants, fillers, anti-static agent, processing aids, clarifiers and the like may also be included in the polymers of the present invention and hence in films formed from them. Films may also contain standard additives such as antiblocking agents, slip agents, mold release agents and so on. These additives are well known in the industry and their use will be familiar to the artisan.

Polymer properties are measured in the absence of additives. Film properties are measured on the formed film and those are likely therefore to contain additives from the polymers.

MDO Film Manufacture

The films of the invention are blown or cast films manufactured by (co)extrusion and blowing/casting as is well known in the art. The films of the invention are preferably 100 to 600 microns in thickness before orientation, preferably 100 to 400 microns. After orientation, the film of the invention is typically 15 to 200 μm, more preferably 20 to 150 μm in thickness. It is especially preferred if the films are 20 to 120 μm in thickness after orientation, such as 25 to 90 microns.

It is preferred if films of the invention are multilayered. Multilayer films are preferably formed from at least three layers, such as 3 layers, 5 layers or 6 layers. Films preferably comprise therefore at least layers A, B and C.

It is preferred if two or more of the layers in the films of the invention comprise a multimodal LLDPE as hereinbefore defined. It is especially preferred if at least two layers of the film comprise a multimodal LLDPE.

The (A) layer of the film is preferably an external layer. It is preferably involved in sealing of the film (ideally to itself). Said layer (A) preferably comprises at least a multimodal LLDPE, in particular a multimodal Ziegler Natta LLDPE. Ideally, this layer is a blend of that multimodal LLDPE with a unimodal LLDPE in particular a metallocene LLDPE. These single site LLDPEs impart excellent sealing behaviour to the films. The (A) layer may also be a blend of the multimodal LLDPE component and a very low density polyethylene as herein described.

Said layer (B) preferably comprises, e.g. consist of a multimodal LLDPE.

Said layer (C) preferably comprises the same structure as layer (A). Preferred films of the invention are therefore ABA type films.

Film Layers

The term "consisting essentially of" used below in relation to film layer materials is meant to exclude only the presence of other polyolefin components, preferably other polymers. Thus said term does not exclude the presence of additives, e.g. conventional film additives, i.e. each layer independently may contain conventional film additives such as antioxidants, UV stabilisers, acid scavengers, nucleating agents, anti-blocking agents, slip agents etc as well as polymer processing agent (PPA) and so on.

Films of the invention preferably comprise layers (A) and (B) below, especially layers (A), (B) and (C) below.

Layer (A)

Accordingly, in a first preferable embodiment (i) of the invention, said layer (A) comprises a mixture of a multimodal LLDPE and unimodal LLDPE or very low density polyethylene. In this embodiment (i) a layer (A) preferably comprises 40-75 wt % of multimodal LLDPE, more preferably 40 to 70% of multimodal LLDPE. Layer (A) of the embodiment (i) preferably comprises 25-60 wt % unimodal LLDPE or very low density polyethylene, more preferably 30-60 wt %. The use of a 50/50 wt % split of multimodal and unimodal LLDPE or very low density polyethylene is especially preferred here. Layer (A) preferably consists essentially of these components.

Layer (B)

Layer (B) preferably comprises at least 50 wt %, preferably at least 60 wt %, more preferably at least 70 wt % of a multimodal LLDPE. In some embodiments even about 80 wt % or more of multimodal LLDPE is preferred. Multimodal LLDPE is preferably a multimodal znLLDPE. Preferably said layer (B) consists of a multimodal LLDPE polymer(s). It may therefore comprise a blend of two multimodal LLDPE's or a single multimodal LLDPE.

Layer (C)

Said layer (C) may have a polymer composition as described in relation to layer (A) above. Preferably layers (A) and (C) are identical in a ABA type film structure.

The film thickness distribution (%) of a ABC layer film is preferably 20 to 40%/20-60%/20-40% of the total film thickness (100%).

In a further preferred embodiment, the films of the invention comprise at least five/six layers, preferably in the following order:
(i) a first outer layer (A),
(ii) a second outer layer (B),
(iii) a first inner layer (C),
(iv) a second inner layer (C),
(v) a third outer layer (B) and
(vi) a fourth outer layer (A)

This film is preferably formed from two identical ABC type films and it can be argued that the centre C layers merge to become one (and hence a 5 layer construction). For an ABCCBA film structure the thickness of the layers may conform to 7.5-27.5%/15-35%/5-25%/15-35%/7.5-27.5%, wherein the total film thickness is 100% and the amount of core layer is the sum of two layers (C).

In an ABCCBA structure it is preferred if the (C) layers are not the same as the (A) layers. In particular, the (C) layers can comprise a very low density polyethylene as hereinbefore defined.

Each A, B or C layer may independent have a composition as hereinbefore defined. Ideally, the ABCCBA film is formed from two identical ABC films laminated together via their (C) layers.

It is preferred that the sealing layer forms at least 18% of total thickness of the film, preferably at least 20%, especially at least 25% of the thickness of the film. If the sealing layer is too thin, the sealing properties of the film are poorer.

The films of the invention can possess valuable mechanical properties such as high impact strength, stiffness, heat resistance and tensile properties.

Most importantly, the maximum seal force achieved using ultrasonic welding is as good as or better than can be achieved using conventional heat sealing, in particular in the transverse direction. Transverse direction seal forces of at least 20 Nmm$^2$ can be achieved, such as at least 30 Nmm$^2$. It is preferred that the seal strength formed by ultrasonic welding is at least twice that formed by heat sealing.

In order to manufacture films to be sealed according to the invention, normally at least two polymer melt streams are simultaneously extruded (i.e. coextruded) through a multi-channel tubular, annular or circular die to form a tube which is blown-up, inflated and/or cooled with air (or a combination of gases) to form a film. The manufacture of blown film is a well known process.

The film of the invention will typically be produced by extrusion through an annular die, blowing into a tubular film by forming a bubble which is collapsed between nip rollers after solidification. Conventional film production techniques may be used in this regard. Typically, the layers will be extruded at a temperature in the range 160° C. to 240° C., and cooled by blowing gas (generally air) at a temperature of 10 to 50° C. to provide a frost line height of 2 to 8 times the diameter of the die. The blow up ratio should generally be in the range 2 to 5, preferably 2.5 to 4. Suitable die diameters are in the range 100 to 250 mm.

The films are then stretched in machine direction to form an oriented film. Stretching is effected to at least 3 times the original film length. Stretching is effected in the machine direction although in theory some transverse direction stretching could also occur. Films can therefore be biaxially oriented. The use of BOPP films is envisaged here.

Biaxially oriented films can be made via two different processes—tubular (bubble) or tenter frame process. Both processes were used early in commercial production of biaxially oriented polypropylene films and both are still used today (Edward P. Moore, Jr., Polypropylene Handbook, Hanser Publishers, 1996, 374 to 375). The tubular frame process is favoured to produce very thin films.

The tenter frame process is more common due to the lower variable costs resulting from very high output and wider availability of the technology than the tubular frame processes.

In the tenter frame process the biaxial orientation of the film is conventionally achieved by drawing the film lengthwise ("machine direction" (MD)) and then, with a tenter, drawing the film in a direction perpendicular to the machine direction ("transverse direction" (TD)).

In machine direction orientation (MDO) the film is running on a heated set of rolls. The temperature of these rolls generally is between 120 to 130° C., but occasionally some lines are using higher temperatures, e.g. fast running lines.

Fast running lines require higher temperatures in order to allow the stretching, in particular if a propylene homopolymer composition is used, for the production of biaxially oriented films (BOPP films).

Stretch ratios for oriented film can be up to 10 in the machine direction (MDO), preferably 4 to 8, especially 4 to 6. In the Transverse Direction (TDO) the stretch ratio is typically between 7 and 10.

The manufacture of oriented polyethylene and polypropylene film is well known. These films are commercially available products with which the skilled person will be familiar.

Substrate

The films of the invention are ultrasonically welded onto a substrate. That substrate is preferably a polyolefin film which is formed from a polyethylene or polypropylene, preferably an oriented polyolefin. Most preferably, the substrate is an oriented polyolefin film which is identical to the film layer, i.e. the film is being sealed to itself.

Ultrasonic Welding

Once the oriented film and substrate have been prepared a seal needs to be formed between them. This is achieved by ultrasonic welding. In ultrasonic welding heat is generated in the bonding area between the film and substrate by mechanical vibration, causing friction that cause the materials being sealed to plasticize, forging an insoluble connection between the parts.

Ultrasonic welding utilizes a welding tool (the sonotrode) that is typically oriented to apply vibrations horizontally or vertically. Sealing quality is very uniform because the energy transfer and the released internal heat remain constant and are limited to the sealing area.

Because ultrasonic welding has very low energy requirements, uses no consumables, requires no cooling water, and has modest space requirements, ultrasonic welding provides cost-effective, environmentally friendly solutions to the problem of polymer sealing.

The parts to be welded are firstly brought into contact and are sandwiched between a fixed shaped nest (anvil) and a sonotrode connected to a transducer. The frequency of the ultrasound can be tailored to effect a seal in the materials being sealed. At least part of the contact area between the film and substrate is therefore subjected to ultrasound. It will be appreciated that the film and substrate may be in contact with each other over a larger area than is actually sealed just due to the nature of the process.

The necessary ultrasound vibrations might vary depending on the nature of the film being sealed and so on. Typically, ultrasound frequencies in the range of 15 kHz to 70 kHz can be employed.

The time for which the sealing surfaces are exposed to ultrasound can be very short, such as 50 to 200 ms.

The ultrasonic energy melts the point contact between the film and the substrate to which the film is being sealed, creating a seal when the ultrasound is stopped (or the film moved away from the ultrasound source). Ultrasonic welding causes local melting of the plastic due to absorption of vibration energy.

The use of ultrasonic welding is highly advantageous as the film is not contacted with a hot sealing bar. The sonotrode remains cold throughout the process. This therefore prevents accumulation of molten polymer on sealing bar and hence intensive cleaning of that bar after sealing. There is therefore significantly reduced downtime by using ultrasonic welding as opposed to heat sealing.

An excellent seal can still be effected even if there is contamination present. It is common that one of the sealing surfaces might be contacted with the material being packaged contaminating the sealing surface. Despite such contamination a strong seal can still be formed using ultrasonic welding. It appears the application of the ultrasound mechanically removes the contaminant from the sealing area. This is important when the product being packaged is one that gives an odour when heated. For example, if pet food is heat sealed with contaminant on the sealing area, the result is a burnt pet food smell. The use of ultrasonic welding avoids that problem.

A further most important benefit of ultrasonic welding is the avoidance of film shrinkage. In oriented film, shrinkage is an enormous problem as these films have a great tendency to shrink. By avoiding high temperature sealing shrinkage, is minimised. Moreover we avoid exposing the contents of a package to high temperature. That is important if the product is one which degrades readily in heat.

It is preferred that during the ultrasonic welding operation the film does not shrink by more than 5% in any direction.

The use of ultrasonic welding may allow more flexibility in film design for packaging. For ultrasonic welding hot tack is not an issue as heat flows after sealing into adjacent (colder) film layers. In case of heat sealing, the adjacent layers are hotter than the seal and that limits hot tack. This limits therefore the nature of films which can be used in the heat sealing environment.

This makes the invention ideal for the packaging of heat sensitive products.

The use of ultrasonic welding also allows a reduction in the head space in packaging. Typically a large head space is used to prevent heat from the sealing operation damaging goods packaged. With ultrasonic welding this problem can be overcome and less film per gram of packaged material might be needed.

Applications

The films of the invention can be employed in a wide variety of end applications however they are of particular interest in the manufacture of packaging, especially food, drink or medical packaging or packaging of goods in medium duty or heavy duty shipping sacks.

In particular the films may be utilised in form, fill and seal packaging technology or in the formation of stand up pouches. It is a particular feature of the invention that the materials described herein can be subjected to ultrasonic welding as well as conventional heat sealing. In particular, ultrasonic welding might be used to seal in the transverse direction whilst heat sealing used for the machine direction.

Preferably, films are sealed within a vertical Form Fill Seal (FFS) packaging line, in which the oriented film is initially welded from the flat film, preferably by ultrasonic welding. The film can then be welded ultrasonically with a first transverse seam, the package filled and closed by means of heat seal or ultrasonic welding.

In a typical FFS machine, the machine is loaded with a continuous flat roll of oriented film. The oriented film approaches the back of a long hollow conical tube, and when the centre of the plastic is near the tube, the outer edges of the film form flaps that wrap around the conical tube. The film is pulled downward around the outside of the tube and a vertical heat-sealing bar clamps onto the edges of the film, bonding the film by melting the seam edges together.

To start the bagging process, a horizontal sealing bar clamps across the bottom edge of the tube, bonding the film together, and cutting off any film below. The sealed tube end is then lowered onto a precision weighing table and the product to be bagged is dispensed through the long conical tube in the centre of the bag. When the gross weight of the product-filled bag is reached, filling stops, and the horizontal sealing bar seals the top of the bag, and simultaneously forms the bottom of the next bag above. This bag is then cut off from the tube and is now a sealed package. There are a number of sealing operations during an FFS process therefore and ultrasonic welding can be used instead of one or more of those heat sealing operations. In particular, the ultrasonic welding replaces any transverse direction heat seal apparatus.

Dual systems are also available for four side sealed packages, as well as packages requiring different materials for each side. Dual systems use two rolls of starting film instead of one, which are fed in from opposite sides of the machine. The bottom and top layers are heat sealed together to form the pouch, and the product is loaded from the top. The pouch with loaded product then advances downwards and the top is sealed and pouch is cut off. The sealing of the top of the pouch forms the bottom of the next pouch.

Again ultrasonic welding can be used to effect one or more of these heat sealing operations.

The films are especially useful in heavy duty shipping sacks or medium duty shipping sacks. To provide strength, heavy duty shipping sacks are often provided with gussets. Where there is a gusset, the film thickness is especially high as there are numerous film folds to seal together. The use of heat sealing in that environment is difficult as the heat required to seal all layers is so high. The use of ultrasonic welding can create a high quality seal independent of the number of layers present.

Stand-up pouches are often made by means of heat sealing. The actual closure of the pouch after filling can be effected by ultrasonic welding. It is a further respect of the invention therefore that the oriented films of the invention can be both heat sealed and ultrasonically welded to a substrate. Where more than one seal is required in a package, both techniques could be used in package formation.

This invention is of particular utility in the formation of heat sensitive products including all types of human food/ drinks, pet food, heat sensitive non consumable products and so on.

Figure 2:
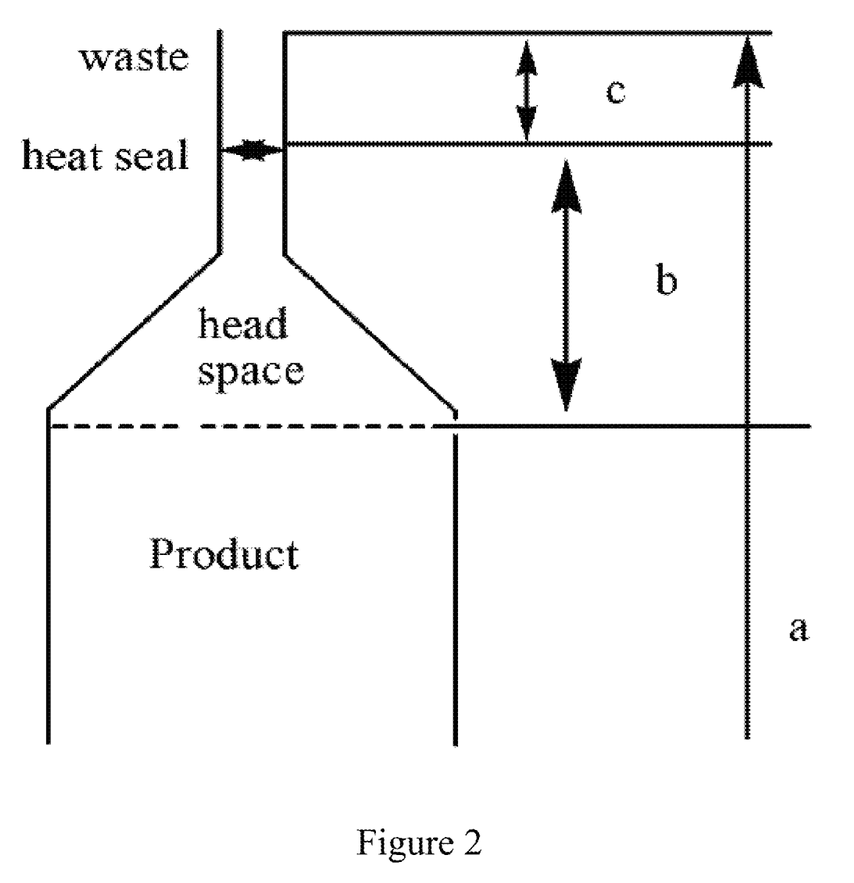
FIG. 2 shows a form fill and seal process described herein.

A particular feature of the invention is represented in FIG. 2. Here a form fill and seal process is depicted in which a is the length of the FFS bag, b is the head space within the bag and c is the welding overhang. Using ultrasonic welding it is envisaged that the values of both b and c can be reduced, perhaps by a combined amount of up to 10%. That might allow a 70 g heavy duty sack to be reduced to a 69 g heavy duty sack. In the context of 400 tonnes of bags per annum, that is an additional 80,000+ bags.

Figure 1:
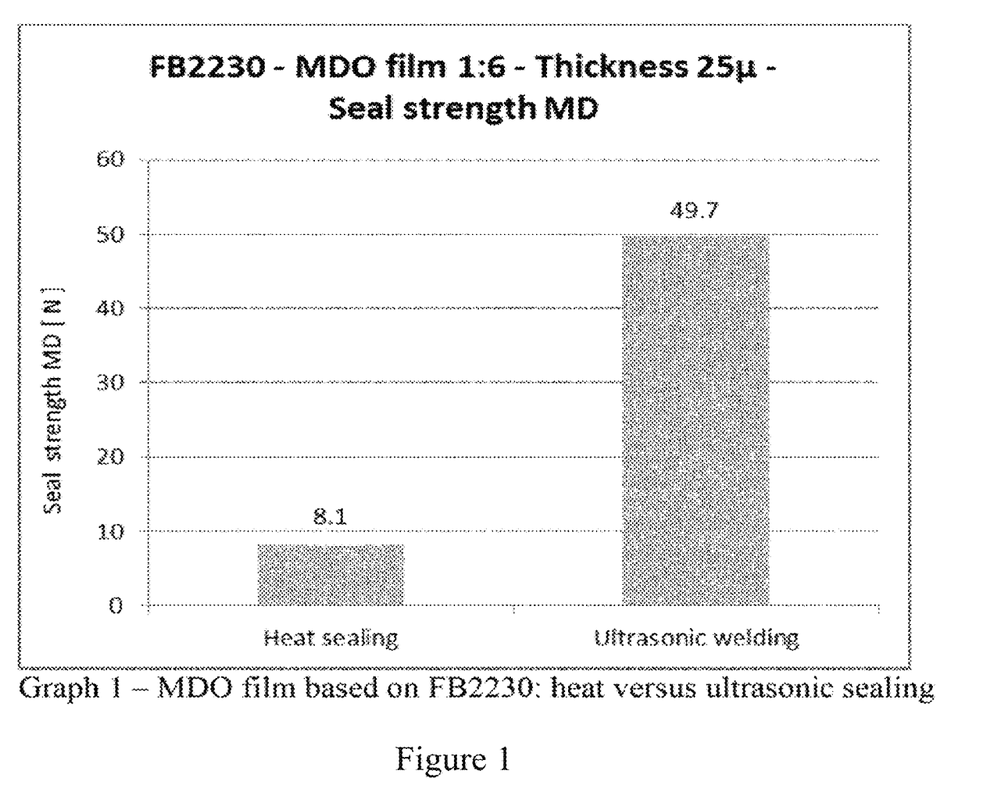
FIG. 1 shows a graph of the seal strength under heat and ultrasound for the polymer of example 1.

The invention will now be described with reference to the following non limited examples and figures. FIG. 1 is a graph showing the seal strength under heat and ultrasound for the polymer of example 1.

Melt Flow Rate

The melt flow rate (MFR) is determined according to ISO 1133 and is indicated in g/10 min. The MFR is an indication of the melt viscosity of the polymer. The MFR is determined at 190° C. for polyethylene and 230° C. for polypropylene. The load under which the melt flow rate is determined is usually indicated as a subscript, for instance $MFR_2$ is measured under 2.16 kg load (condition D), $MFR_5$ is measured under 5 kg load (condition T) or $MFR_{21}$ is measured under 21.6 kg load (condition G).

Comonomer Content (NMR):

The comonomer content was determined by using $^{13}C$-NMR. The $^{13}C$-NMR spectra were recorded on Bruker 400 MHz spectrometer at 130° C. from samples dissolved in 1,2,4-trichlorobenzene/benzene-d6 (90/10 w/w).

Molecular Weight $M_w$, $M_n$ and MWD are measured by Gel Permeation Chromatography (GPC) according to the following method:

The weight average molecular weight $M_W$ and the molecular weight distribution (MWD=$M_w/M_n$ wherein $M_n$ is the number average molecular weight and $M_w$ is the weight average molecular weight) is measured according to ISO 16014-4:2003 and ASTM D 6474-99. A Waters GPCV2000 instrument, equipped with refractive index detector and online viscosimeter was used with 2×GMHXL-HT and 1×G7000HXL-HT TSK-gel columns from Tosoh Bioscience and 1,2,4-trichlorobenzene (TCB, stabilized with 250 mg/L 2,6-Di tert-butyl-4-methyl-phenol) as solvent at 140° C. and at a constant flow rate of 1 mL/min. 209.5 μL of sample solution were injected per analysis. The column set was calibrated using universal calibration (according to ISO 16014-2:2003) with at least 15 narrow MWD polystyrene (PS) standards in the range of 1 kg/mol to 12 000 kg/mol. Mark Houwink constants were used as given in ASTM D 6474-99. All samples were prepared by dissolving 0.5-4.0 mg of polymer in 4 mL (at 140° C.) of stabilized TCB (same as mobile phase) and keeping for max. 3 hours at a maximum temperature of 160° C. with continuous gentle shaking prior sampling in into the GPC instrument.

As it is known in the art, the weight average molecular weight of a blend can be calculated if the molecular weights of its components are known according to:

$$Mw_b = \sum_i w_i \cdot Mw_i$$

where $Mw_b$ is the weight average molecular weight of the blend, $w_i$ is the weight fraction of component "i" in the blend and $Mw_i$ is the weight average molecular weight of the component "i".

The number average molecular weight can be calculated using the well-known mixing rule:

$$\frac{1}{Mn_b} = \sum_i \frac{w_i}{Mn_i}$$

where $Mn_b$ is the weight average molecular weight of the blend, $w_i$ is the weight fraction of component "i" in the blend and $Mn_i$ is the weight average molecular weight of the component "i".

Density

Density of the polymer was measured according to ISO 1183/1872-2B.

EXAMPLE 1

PE Films

Films having a monolayer structure were coextruded on a 7-layer Alpine coextrusion line with die diameter 300 mm, at a blow up ratio (BUR) of 1:2.5, frost line height 3D and Die gap 1.4 mm. All 7 layers were the same material and had equal layer distribution. The temperature settings on all extruders were 210° C. and the temperature setting on the extruder die was 210° C.

Stretching was carried out using a monodirectional stretching machine manufactured by Hosokawa Alpine AG in Augsburg/Germany. The film obtained from blown film extrusion was pulled into the orientation machine then stretched between two sets of nip rollers where the second pair runs at higher speed than the first pair resulting in the desired draw ratio. After exiting the stretching machine the film is fed into a conventional film winder where the film is slit to its desired width and wound to form reels.

The PE film samples used for the determinations of PE film properties as defined in the description were prepared as described above and had starting film thickness of 150 μm before stretching, draw ratio of 1:6, final film thickness of 25 μm after stretching.

This film was sealed to itself in the transverse direction using ultrasonic welding or heat sealing. The polymer tested, FB2230 (a bimodal Ziegler Natta LLDPE polymer of $MFR_2$ 0.2 g/10 min and density 923 kg/m$^3$) shows much improved seal strength when ultrasonically sealed, especially in the transverse direction (FIG. 1 and table 1).

EXAMPLE 2

PP Film Production

Films having a monolayer structure were produced on a monolayer cast film line with flat die width of 800 mm, take-off-speed: 8 m/min, melt temperature: 250° C. for BC918CF and 240° C. for RD208CF. Temperatures (same for both materials) of the chill rolls: 20° C. and 30° C. respectively; die gap 0.8 mm.

BC918CF: The monolayer PP-film samples used for the determinations of film properties as defined in the description were prepared as described above and had starting film thickness of 250 μm before stretching, draw ratio of 1:5, final film thickness of 50 μm after stretching. This film was sealed to itself in the machine and transverse direction using ultrasonic welding.

RD208CF: The monolayer PP-film samples used for the determinations of film properties as defined in the description were prepared as described above and had starting film thickness of 240 μm before stretching, draw ratio of 1:6, final film thickness of 40 μm after stretching. This film was sealed to itself in the transverse direction using ultrasonic welding.

BC918CF is a heterophasic polypropylene of MFR2=3 g/10 min. RD208CF is a propylene ethylene random copolymer.

EXAMPLE 3

Heavy Duty Shipping Sacks

Films having an ABA-structure were coextruded on a 3-layer Windmöller&Hölscher Varex coextrusion line with die diameter 200 mm, at a blow up ratio (BUR) of 1:3, frost line height 600 mm and Die gap 1.2 mm. The temperature settings on the three extruders were A=210° C./B=210° C./C=210° C. and the temperature setting on the extruder die was 200° C.

Stretching was carried out using a monodirectional stretching machine manufactured by Hosokawa Alpine AG in Augsburg/Germany. The film obtained from blown film extrusion was pulled into the orientation machine then stretched between two sets of nip rollers where the second pair runs at higher speed than the first pair resulting in the desired draw ratio.

The PE film samples used for the determinations of PE film properties as defined in the description were prepared as described above and had starting film thickness of 480 μm before stretching, draw ratio of 1:6, final film thickness of 80 μm after stretching. This film was sealed to itself in the machine and transverse direction using ultrasonic welding.

The film has the same structure as that of example 1 of EP-A-1941998 (85% mLLDPE 1, 15% LDPE 1 (layers A) and (layer B) 80% znLLDPE 3, 20% mLLDPE 1).

TABLE 1

Results of ultrasonic sealing trials on MDO films

PP based MDO films

| | Seal direction | Seal strength N/mm² | Ultrasonic sealing parameters |
|---|---|---|---|
| BC918CF 50μ-1:5 | MD | 4.6 | Seal time: 120 ms-Force: 1091 N-20 kHz-Amplitude: 65 μm |
| | TD | 20.5 | Seal time: 120 ms-Force: 888 N-20 kHz-Amplitude: 65 μm |
| RD208CF 40μ-1:6 | MD | — | |
| | TD | 16.2 | Seal time: 120 ms-Force: 907 N-20 kHz-Amplitude: 65 μm |

PE based MDO films

| | Seal direction | Seal strength N/mm² | |
|---|---|---|---|
| HDSS film 80μ | MD | 4.8 | Seal time: 120 ms-Force: 1027 N-20 kHz-Amplitude: 65 μm |
| | TD | 34.5 | Seal time: 120 ms-Force: 888 N-20 kHz-Amplitude: 65 μm |
| FB2230 25μ-1:6 | MD | — | |
| | TD | 49.7 | Seal time: 120 ms-Force: 850 N-20 kHz-amplitude: 65 μm |

TABLE 1-continued

Results of ultrasonic sealing trials on MDO films

Seal strength measurement of ultrasonic welded samples
Test parameters ZWICK trekbank

| | |
|---|---|
| pre load | 0.25 N |
| time | 20 s |
| speed up | 2 mm/min |
| break detector | 75 % Fmax |
| dig gauge length | 10 mm |

Test specimen for sealing: width: 25.4 mm, length: 300 mm.

It can clearly be seen that transverse direction heat sealing is markedly improved relative to machine direction sealing.

The invention claimed is:

1. A process for sealing a machine direction oriented (MDO) film comprising an LLDPE to a substrate comprising bringing said film and said substrate into contact and subjecting at least a part of the contact area to ultrasound so as to form a seal between said film and said substrate, wherein said substrate is the film comprising an LLDPE and said film is sealed to itself.

2. A process as claimed in claim 1 wherein the seal is formed in the transverse direction.

3. A process as claimed in claim 1 wherein the MDO film has been stretched 4 to 8 times its original length.

4. A process as claimed in claim 1 wherein the UW frequency is 15 to 79 kHz.

5. A process as claimed in claim 1 wherein the film is a multilayer film.

6. A process as claimed in claim 1 wherein ultrasonic welding is effected for 50 to 200 ms.

7. A process as claimed in claim 1 wherein during sealing, the film does not shrink by more than 5% of its length in any direction.

8. A process for the packaging of a product, wherein the product is a heat sensitive product, comprising providing a container having an open end comprising a machine direction oriented (MDO) film comprising an LLDPE;
filling said container with said product by dispensing said product through the open end of the container; and
sealing said container by ultrasonically welding the open end to itself.

9. A process for the packaging of a product, wherein the product is a heat sensitive product, comprising forming a container having an open end from a machine direction oriented (MDO) film comprising an LLDPE;
filling said container with said product by dispensing said product through the open end of the container; and
sealing said container by ultrasonically welding the open end to itself.

10. The product obtained by the process of claim 1.
11. The product obtained by the process of claim 8.
12. The product obtained by the process of claim 9.

* * * * *